US010434624B2

(12) United States Patent
Farrell et al.

(10) Patent No.: US 10,434,624 B2
(45) Date of Patent: Oct. 8, 2019

(54) ROTO PEENING ORBITAL DRILLING TOOL

(71) Applicant: The Boeing Company, Chicago, IL (US)

(72) Inventors: Nicholas R. Farrell, Long Beach, CA (US); James D. Gamboa, Anaheim, CA (US); Wesley E. Holleman, Long Beach, CA (US); Gary Lipczynski, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 15/204,226

(22) Filed: Jul. 7, 2016

(65) Prior Publication Data

US 2018/0009082 A1 Jan. 11, 2018

(51) Int. Cl.

*B23B 51/00* (2006.01)
*B24B 39/00* (2006.01)
*B23B 51/08* (2006.01)
*B23C 5/10* (2006.01)
*B24B 39/02* (2006.01)
*B23P 9/00* (2006.01)

(52) U.S. Cl.

CPC ............ *B24B 39/006* (2013.01); *B23B 51/00* (2013.01); *B23B 51/08* (2013.01); *B23C 5/10* (2013.01); *B23P 9/00* (2013.01); *B24B 39/02* (2013.01); *B23C 2220/52* (2013.01); *B23C 2220/605* (2013.01); *B23C 2226/27* (2013.01); *B23C 2270/04* (2013.01)

(58) Field of Classification Search

CPC ................ B23D 2277/14; B23B 51/08; B23B 2220/445; B23B 2222/28; B24B 39/006; B24B 39/02; B23C 5/10; B23C 2220/605; B23C 2222/28; B23C 2220/52

See application file for complete search history.

(56) References Cited

U.S. PATENT DOCUMENTS 3,871,139 A * 3/1975 Rands ................... B24B 39/006 15/104.066
5,619,877 A * 4/1997 Graf ...................... B24B 39/026 451/465
7,690,970 B2 * 4/2010 Palushaj ................ B24B 7/186 451/353
7,954,348 B2 * 6/2011 Forgues ................. B24B 49/16 451/466
8,910,851 B2 * 12/2014 Rosal ................ B23K 20/1215 228/112.1
9,358,670 B2 * 6/2016 Kolthoff .................. B24D 9/08
9,517,535 B2 * 12/2016 Zanon ....................... B23P 6/00

* cited by examiner

*Primary Examiner* — Rick K Chang
(74) *Attorney, Agent, or Firm* — Felix L. Fischer

(57) ABSTRACT

A machining tool incorporates a shaft having a first end configured to fit into a machining collet. A cutting portion extends from a second end of the shaft. A residual stress inducer is located between the first and second ends and includes a torsion element joined to the shaft at a connection end. A carbide tip is present on a free end opposite the connection end and the torsion element is configured such that a selected rotational speed, altered from a normal cutting speed, causes the carbide tip of the torsion element to contact a workpiece surface.

15 Claims, 11 Drawing Sheets

22
14
10
12
26a
26b
16
20
24

12
26b
44
26a
36
38
38
40
42
42
40
34
44
16
32

ROTO PEENING ORBITAL DRILLING TOOL

BACKGROUND INFORMATION

Field

Embodiments of the disclosure relate generally to machining tools and more particularly to a combination tool having a cutting element and an expandable peening element.

Background

Machining operations for drilling or milling often require peening for final surface preparation. In current practice the drill bit or milling cutter must be removed from the machine and replaced with a peening device or the part moved from the machine tool to a separate location for peening. Orbital drilling is a comparatively new process for generating holes that uses a helical milling cutter path to machine holes rather than the conventional axial drilling process. This cutting process is particularly beneficial when generating holes in mixed stack materials such as titanium and carbon fiber reinforced plastic (CFRP). This process also improves fatigue properties in these materials. However, the process has been shown to take a reduction in fatigue life in aluminum. While the drill/ream process has better fatigue life in aluminum, this process requires more coolant which creates a need for extensive clean up, produces interface and exit burrs that must be removed prior to installation of a fastener and has inferior fatigue properties in titanium and steel. All conventional drilling processes are time consuming and may present a greater risk to the mechanics. No orbital cutting tools or processes that improve fatigue life in aluminum open hole coupons exist in the prior art.

SUMMARY

Exemplary embodiments provide a machining tool incorporating a shaft having a first end configured to fit into a machining collet. A cutting portion extends from a second end of the shaft. A residual stress inducer is located between the first and second ends and includes a torsion element joined to the shaft at a connection end. A carbide tip is present on a free end opposite the connection end and the torsion element is configured such that a selected rotational speed, altered from a normal cutting speed, causes the carbide tip of the torsion element to contact a workpiece surface.

The embodiments provide a method for inducing residual stress in a workpiece surface by machining the work piece with a cutting portion of a tool at a first rotational speed. A residual stress inducer having a torsion element is restrained within an outer diameter of the cutting portion at the first rotational speed. The rotational speed is then altered to extend the torsion elements to allow contact with the surface of the workpiece by a carbide tip on the torsion element.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein provide a residual stress inducer in the form of a peening device or feature integrated onto a cutting tool or tool holder that follows the cutting portion of the tool through the hole. After the cutting feature enters the material and creates the hole, the peening device enters the hole and peens the hole wall, creating compressive residual stress. This allows for an orbital process to create a hole with acceptable fatigue properties in a single pass, (without requiring a secondary process). While described herein for embodiments employed in an orbital process, the operational elements of the invention are equally applicable for embodiments of tools employing other standard rotary machining operations such as milling, drilling or cutting.

Figure 1A:
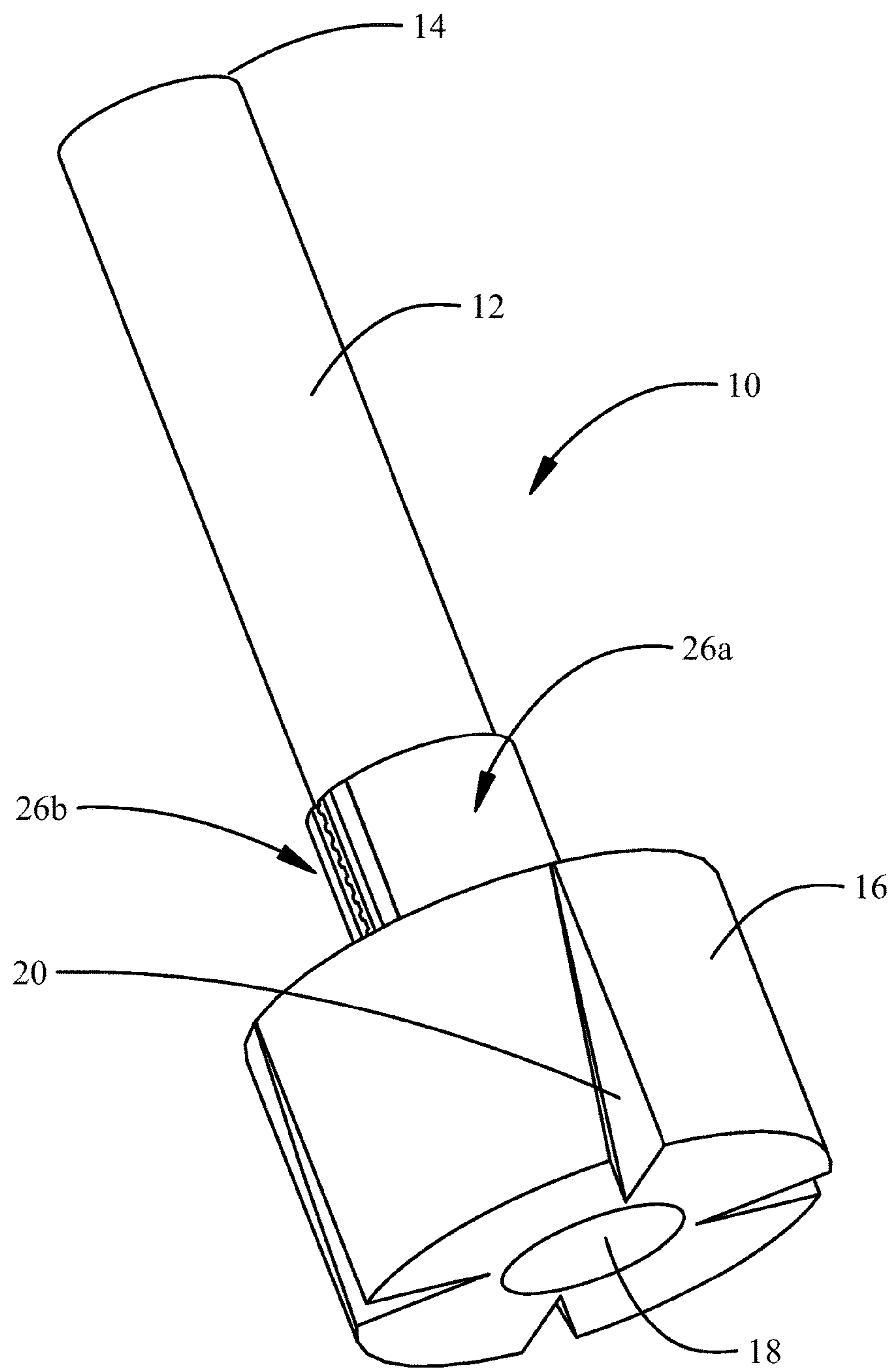
FIG. 1A is a bottom perspective view of an example embodiment of a roto peening orbital drilling tool with the peening element in a retracted position.
Figure 1B:
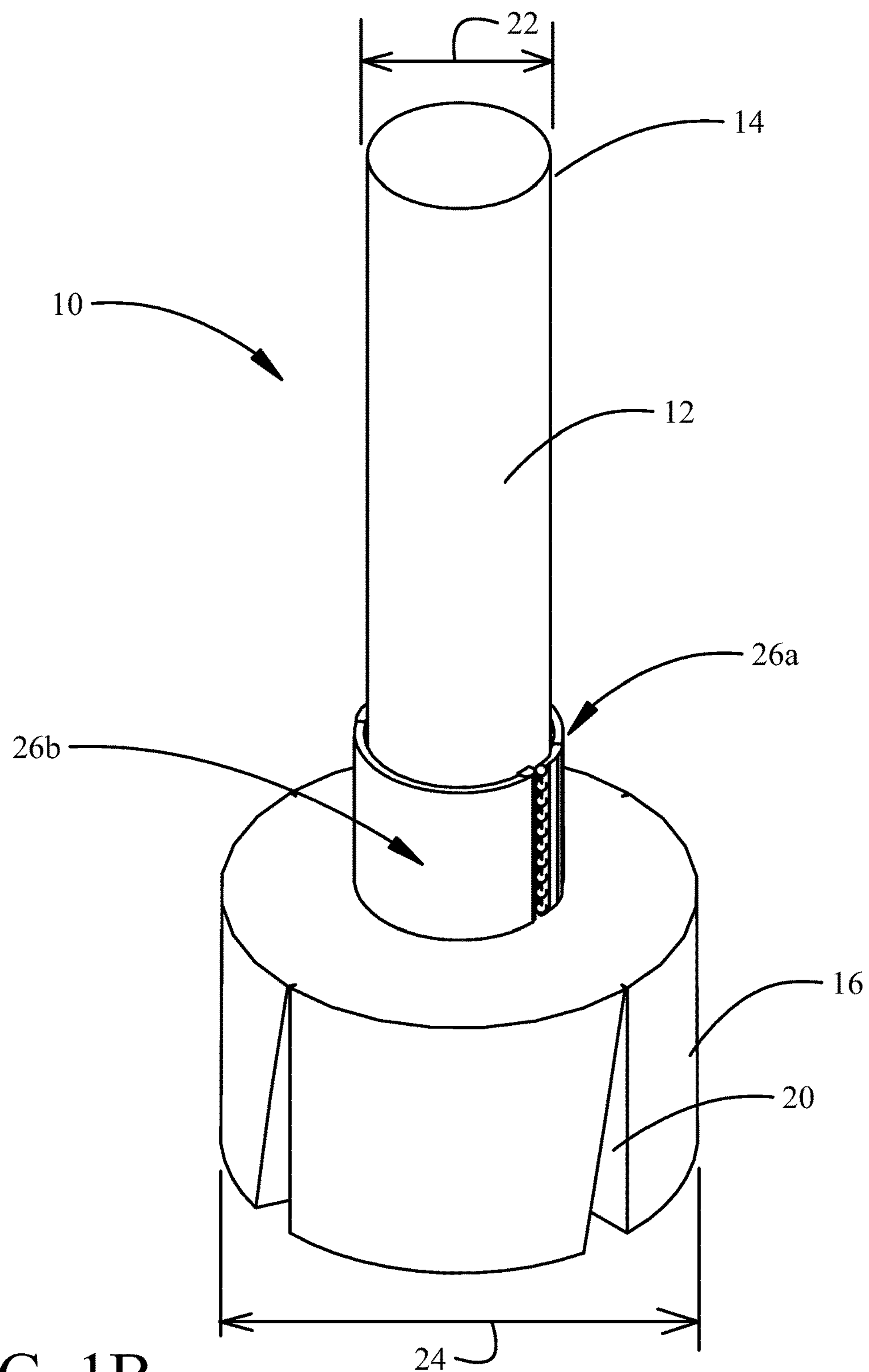
FIG. 1B is a top perspective view of the embodiment of FIG. 1.
Figure 1C:
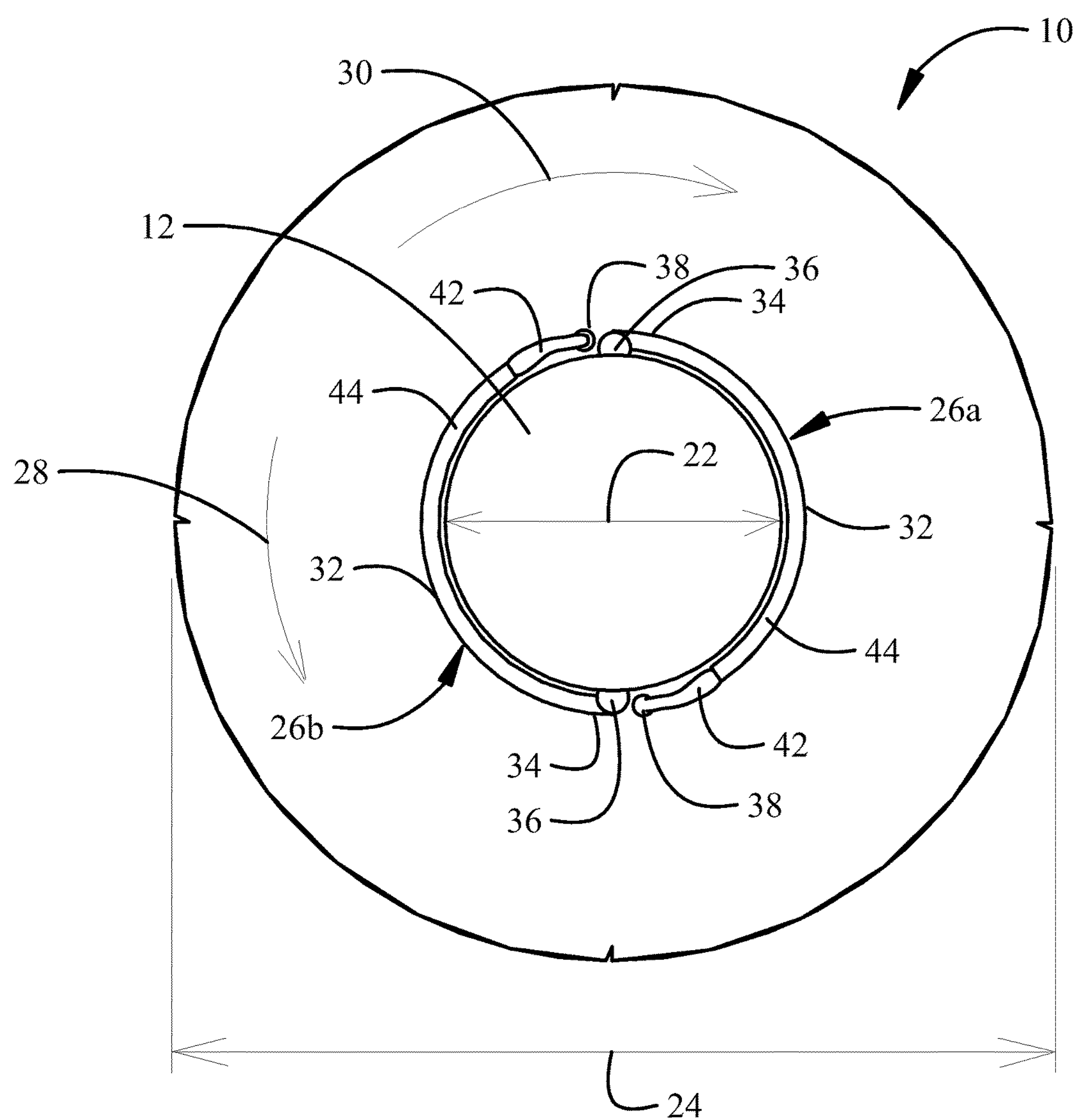
FIG. 1C is a top view of the embodiment of FIG. 1.

Referring to the drawings, FIGS. 1A-1B show various views of an exemplary embodiment of a roto peening orbital drilling tool 10. The tool 10 incorporates a shaft 12 having a first end 14 adapted for engagement by a chuck or collet of an orbital drill or other machining device. A cutting portion 16 extends from a second end 18 of the shaft 12. The cutting portion 16 incorporates flutes or teeth 20. The shaft 12 has a diameter 22 less than a diameter 24 of the cutting portion 16. A residual stress inducer in the form of a pair of peening elements 26*a*, 26*b*. While two peening elements are shown one element or multiple elements may be employed in alternative embodiments. The peening elements 26*a*, 26*b* are adapted to be closely received on the shaft 12 between the cutting portion 16 and first end 14 of the shaft. During cutting operation of the cutting portion 16 the peening elements 26*a*, 26*b* remain concentrically within the diameter 24 of the cutting portion 16 to avoid any interference with the cutting operation. The residual stress inducer is operable by increasing the rotational speed of the tool 10 in the cutting direction (represented by arrow 28 in FIG. 1C) or by reversing the rotational direction of the tool (represented by arrow 30) to create centrifugal force urging the peening elements 26*a*, 26*b* radially outward.

Figure 2A:
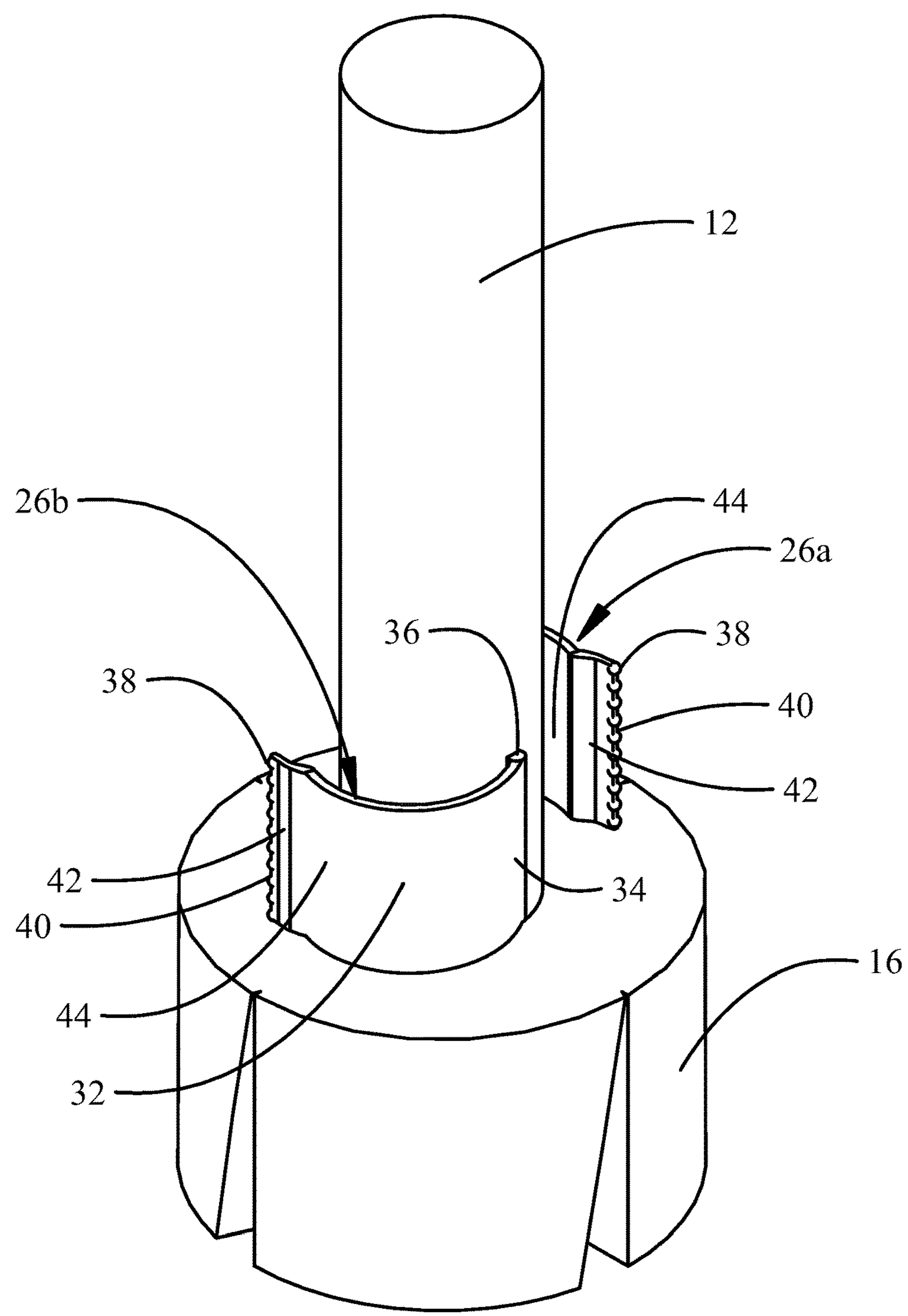
FIG. 2A is a top perspective view of the embodiment with the peening element partially extended at a cutting rotational speed.
Figure 2B:
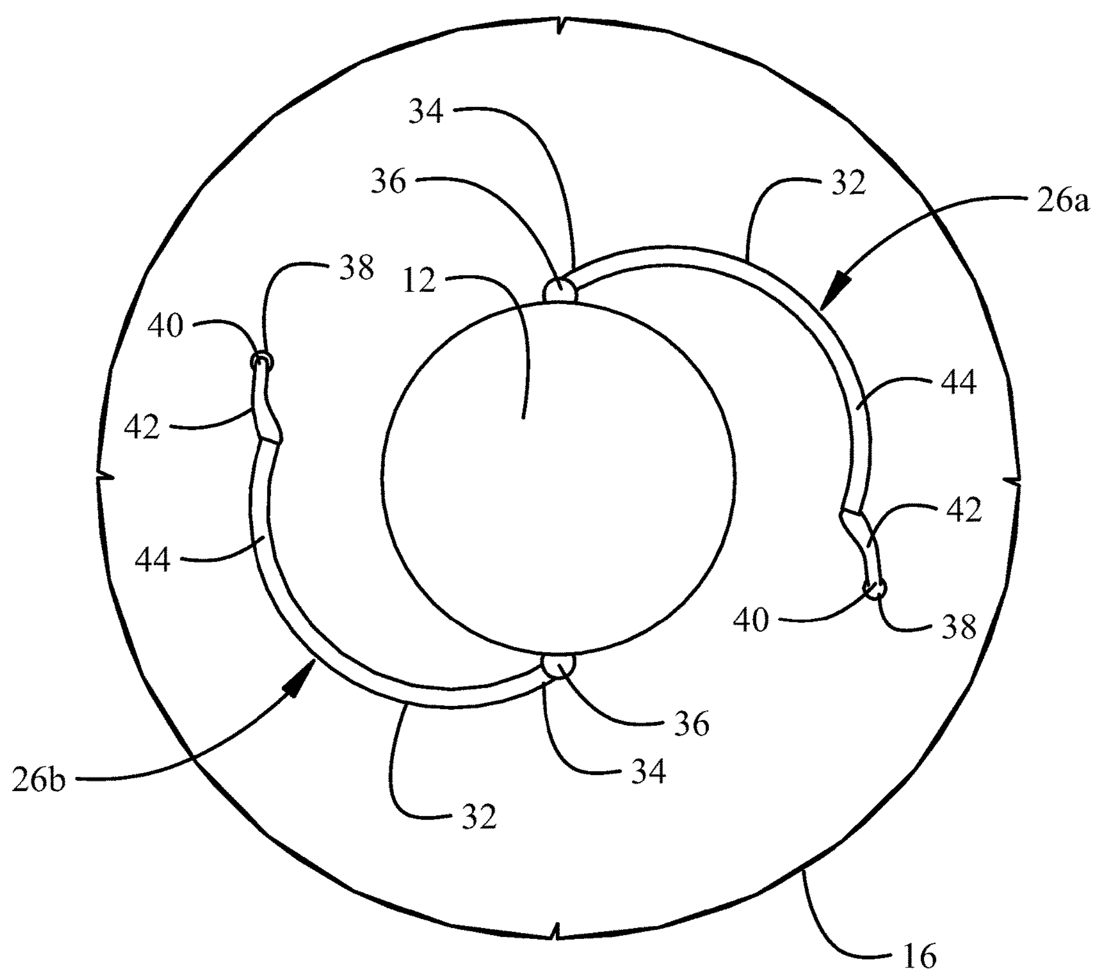
FIG. 2B is a top view of the embodiment as shown in FIG. 2A.

As shown in FIGS. 2A and 2B during cutting operation the peening elements 26*a*, 26*b* may partially extend due to centrifugal forces at the cutting rotational speed. The peening elements 26_a_, 26_b_ have a torsion element 32 which is attached to the shaft 12 at a connection end 34. The attachment may be accomplished by a rotational element 36 which may be a "live hinge" created by a flexible portion of the torsion element proximate the connection end 34 or a rotatable hinge as shown in the drawings. Alternatively, the rotational element 36 may be a rotary spring such as a helical or coil spring to provide or enhance the predetermined resistance to the centrifugal forces for the desired range of extension induced by rotation of the tool. A set of carbide balls 38 or comparable elements provide a carbide tip on the torsion element 32 at a free end 40 opposite the connection end 34. For the embodiment shown, a flexible element 42 interconnects the carbide balls 38 to a body portion 44 of the torsion elements 32. The exemplary configuration allows the torsion element 32 to have a resiliency necessary to sufficiently resist the centrifugal forces at the rotational speed for the cutting operation to retain the peening elements within the cutting element diameter 24 to avoid interference with the cutting operation.

Figure 3A:
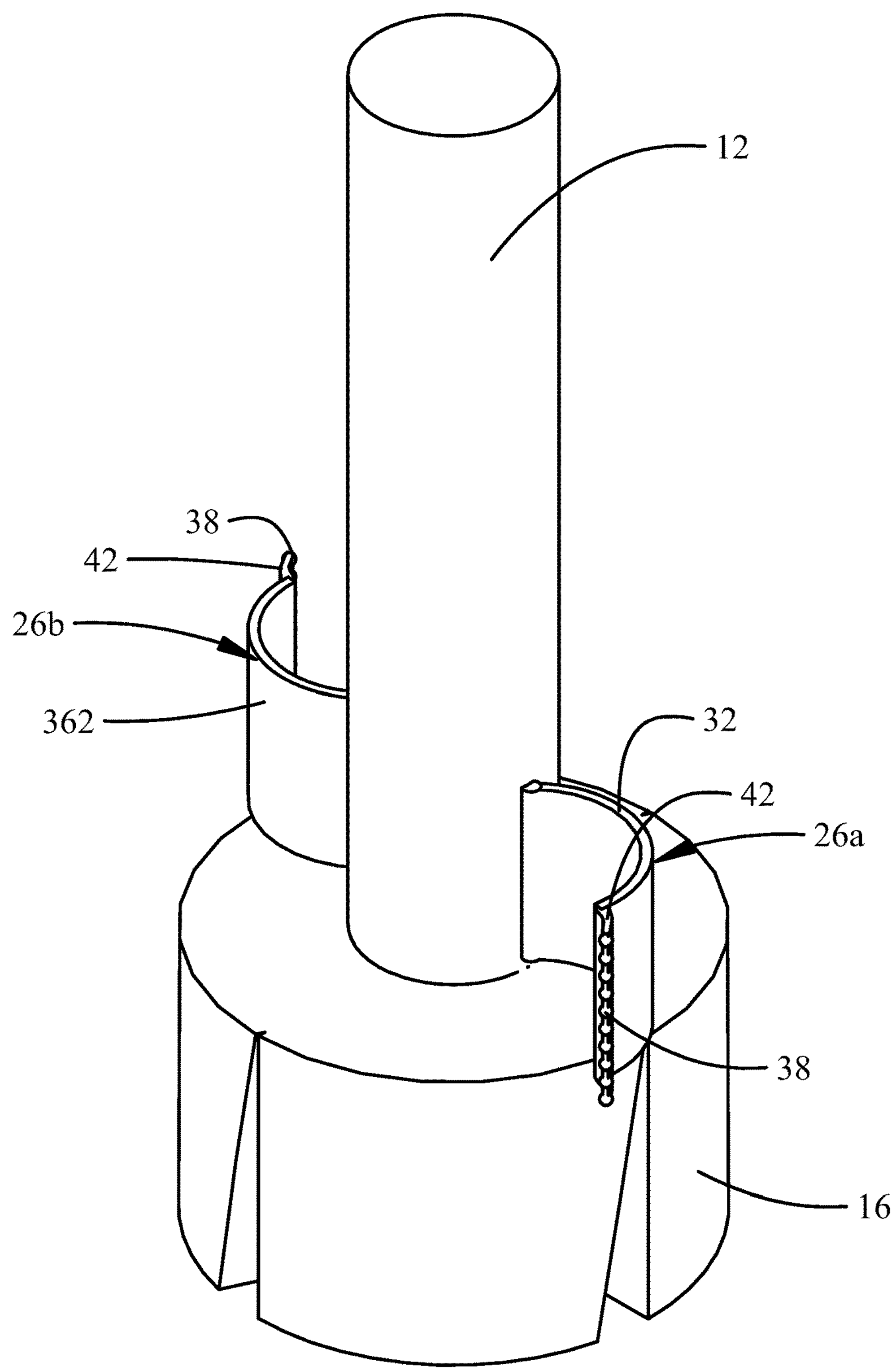
FIG. 3A is a top perspective view of the embodiment with the peening element fully extended at a peening rotational speed.
Figure 3B:
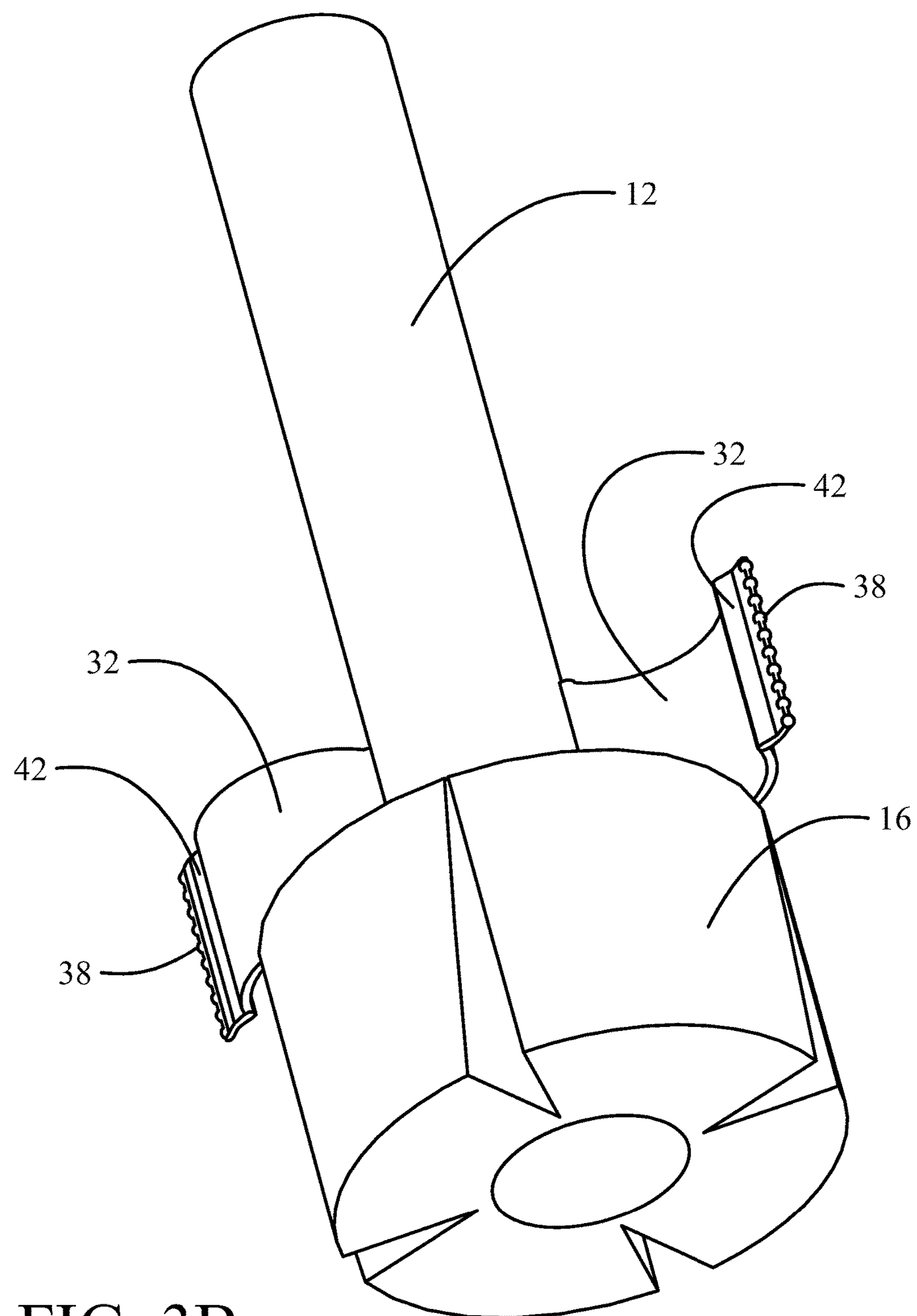
FIG. 3B is a bottom perspective view of the embodiment as shown in FIG. 3A
Figure 3C:
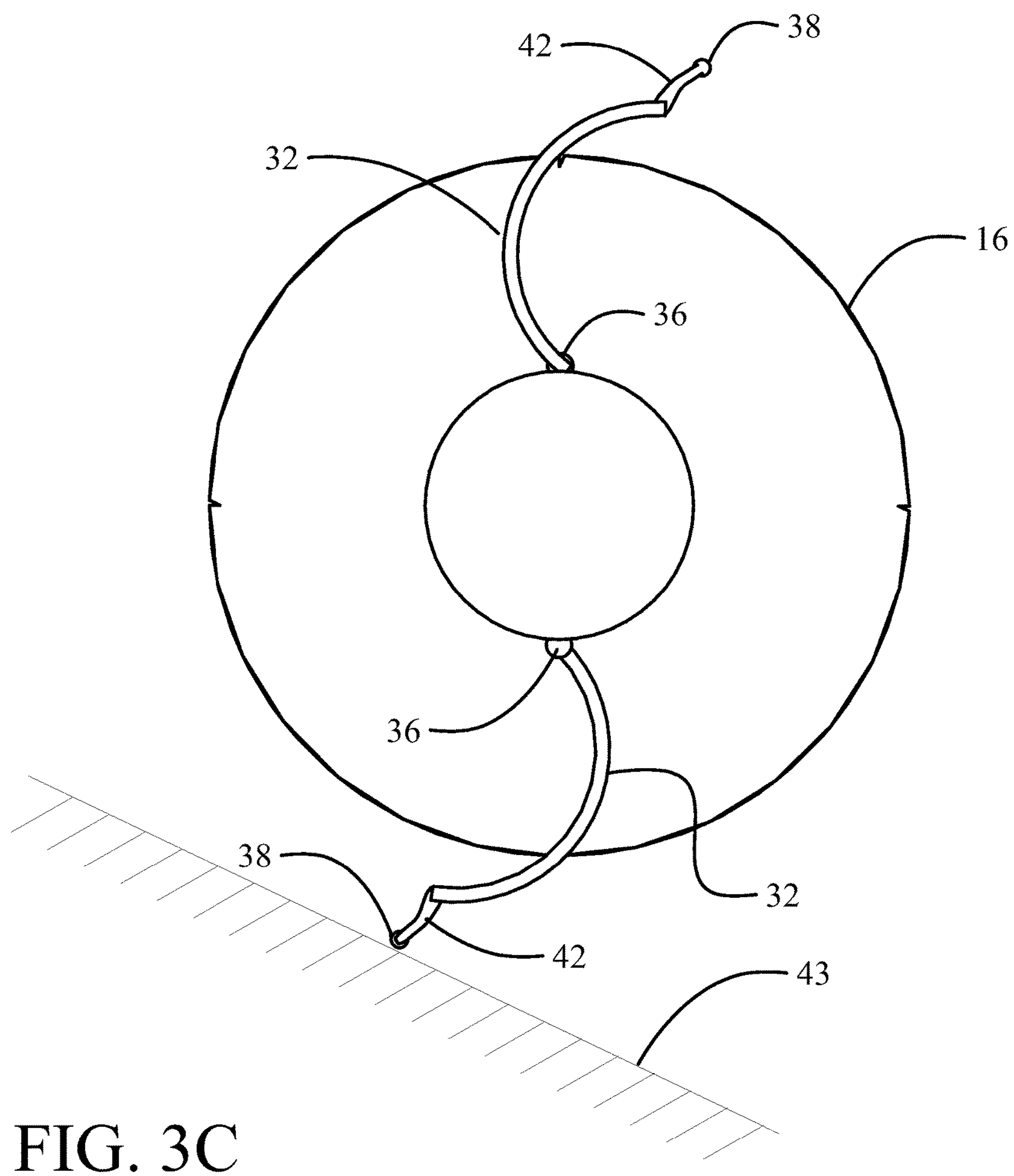
FIG. 3C is a top view of the embodiment as shown in FIG. 3A.

FIGS. 3A-3C show the residual stress inducer fully deployed with the peening elements 26_a_, 26_b_ extended beyond the diameter 24 of the cutting portion 16. The flexible element 42 allows more active surface interaction by the carbide balls 38 with a surface 43 of the workpiece during the peening operation. In certain embodiments the torsion elements 32 may be sufficiently flexible to provide desired active surface interaction and the flexible elements may be eliminated. As previously described, the full extension of the peening elements 26_a_, 26_b_ is accomplished in certain embodiments by increasing rotational speed of the tool 10 whereby the centrifugal forces urge the peening elements outward to or beyond the diameter 24 of the cutting portion 16. In alternative embodiments, the peening operation may be induced by reversing the rotational direction which not only provides centrifugal force on the peening elements but aerodynamic force operating on the torsion element 32 to enhance the extension force. With the peening elements 26_a_, 26_b_ extended, the carbide balls 38 impact the surface of the workpiece. Flexibility of the flexible elements 42 and/or the torsion elements 32 provides the desired active surface interaction by the carbide balls 38. For exemplary embodiments, the flexible elements 42 may be a fabric flap. The torsion elements 32 may be thin resilient steel or metallic alloy or may be a composite or impregnated fabric having resilient flexibility to conform to the shaft curvature and suitably react to the centrifugal forces for the desired range of extension.

Figure 4A:
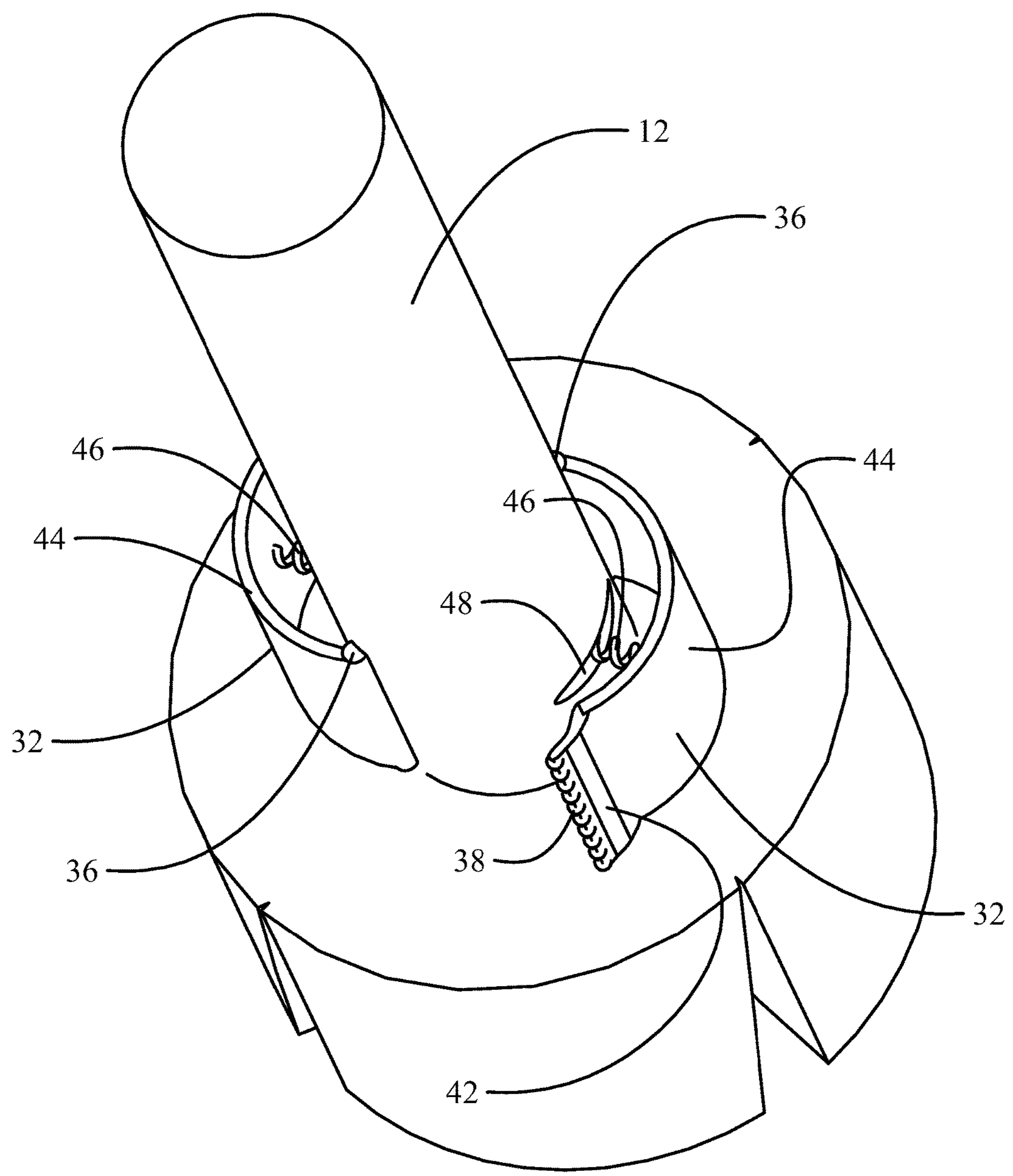
FIG. 4A is a top perspective view of an alternative embodiment employing an intermediate spring attachment for the peening element.
Figure 4B:
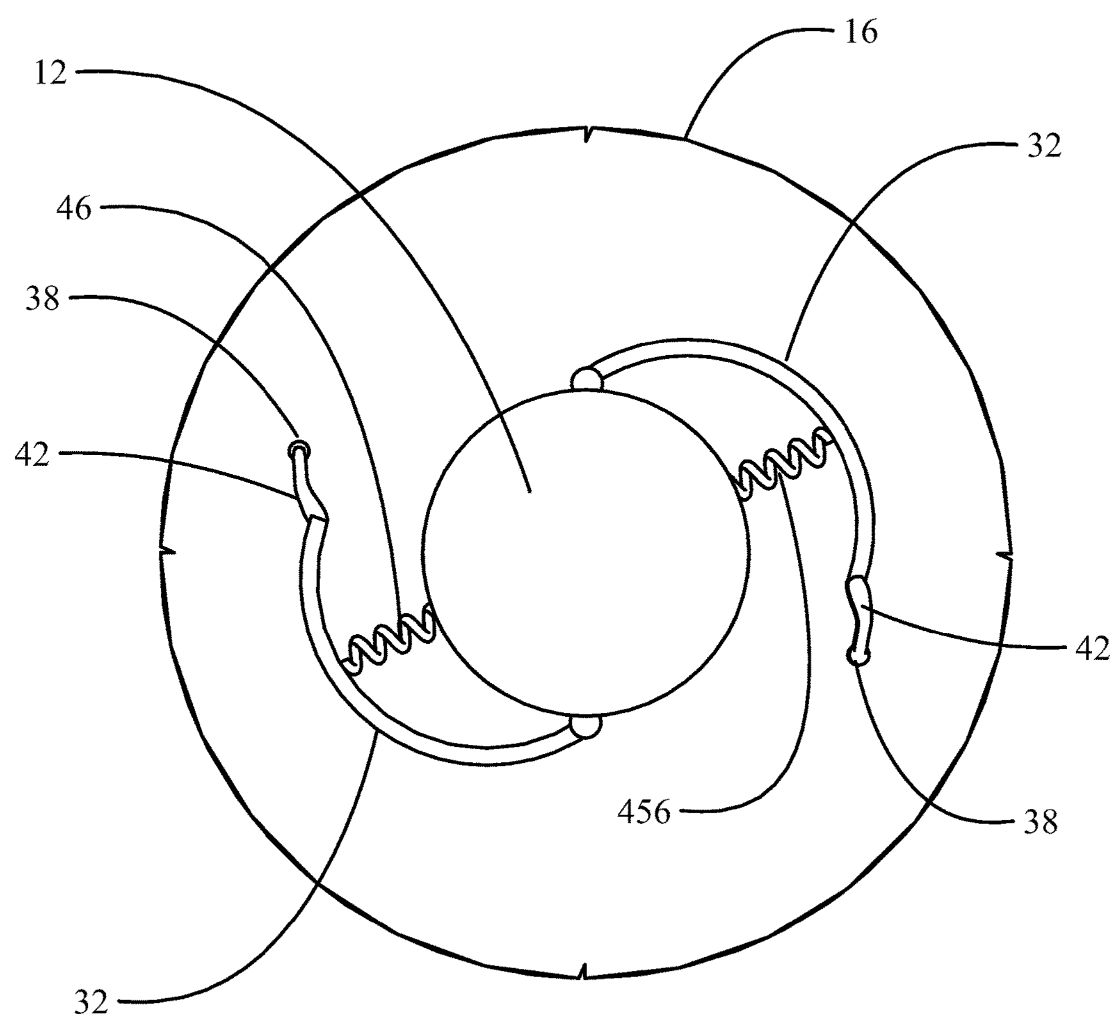
FIG. 4B is a top view of the alternative embodiment of FIG. 4A.

In an alternative embodiment as shown in FIGS. 4A and 4B a spring 46 may be attached from the body 44 of the torsion element 32 into or through the shaft 12 to provide centripetal force to urge the torsion element toward the shaft to maintain the peening elements 26_a_, 26_b_ within the diameter of the cutting portion 16 at the rotational speeds incurred during the cutting operation (seen in FIGS. 4A and 4B). If the spring 46 extends through the shaft for interconnection between the opposing torsion elements 32, a slot 48 through the shaft may be employed for clearance of the spring during extension and retraction of the peening elements about the hinges 36. The spring 46 is sufficiently resilient to allow expansion of the peening elements to the extended position at the rotational speed for peening.

While the torsion elements 32 are shown as curved for the exemplary embodiments, where relative diameters of the shaft and cutting portion are sufficiently different, the torsion elements may be straight with length sufficient, when radially extended, to reach beyond the diameter of the cutting portion but rotated to within that diameter by either the rotational element incorporating a rotational spring or a centripetal spring. Alternatively the torsion element may be variably resilient along its length with a living hinge at the connection end and a preset resilient curvature extending from the living hinge toward the free end whereby the free end and carbide tip (along with any included flexible element) remain within the diameter of the cutting tool at the rotational speed for cutting. The preset curvature is then straightened by the centrifugal force at the altered rotational speed and/or direction for extension of the carbide tip into contact with the surface of the workpiece.

Figure 5:
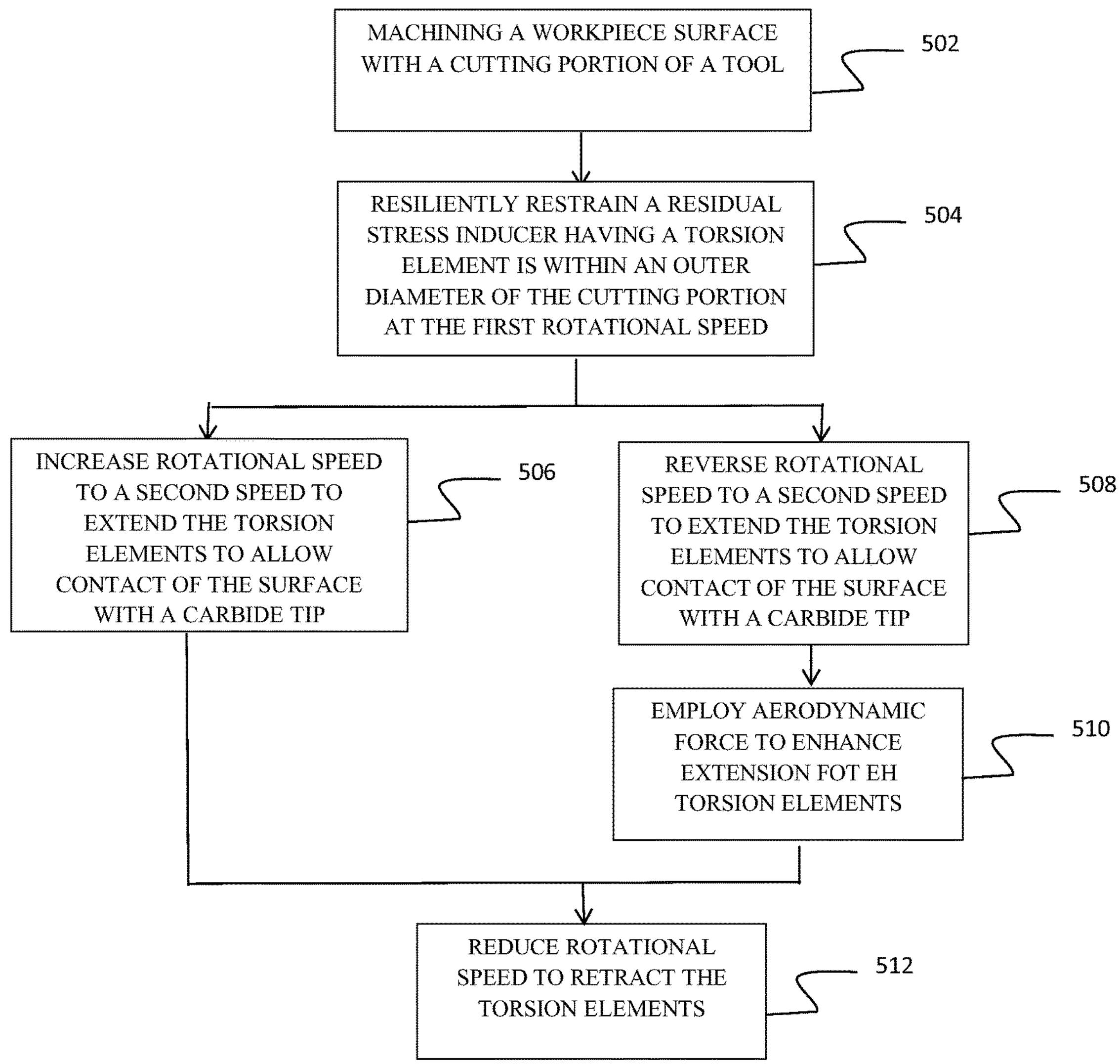
FIG. 5 is a flow chart demonstrating a method for machining employing the embodiments disclosed herein.

FIG. 5 shows a method for inducing residual stress in a workpiece employing the embodiments described herein. Residual stress may be induced in a workpiece in a combined operation with machining of the workpiece surface such as in orbital drilling by machining the work piece with a cutting portion 16 of a tool 10 at a first rotational speed, step 502. A residual stress inducer having a torsion element 32 is resiliently restrained within an outer diameter 24 of the cutting portion 16 at the first rotational speed, step 504. After completion of the operation of the cutting portion 16, rotational speed of the tool 10 is altered to extend the torsion elements 32 to allow contact with the surface of the workpiece by a carbide tip on the torsion element such as carbide balls by increasing to a second speed, step 506, or reversing direction and rotating at an extension speed, step 508. Aerodynamic force may also be employed on the torsion element in addition to the centrifugal force induced by the rotation to enhance extension of the torsion elements, step 510. Upon completion of peening, the rotational speed of the tool 10 may then be reduced for retraction of the torsion elements 32, step 512.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A machining tool comprising:

a shaft having a first end configured to fit into a machining collet;

a cutting portion extending from a second end of the shaft;

a residual stress inducer located between the first and second ends, the residual stress inducer having:

a torsion element having a connection end and a free end, said torsion element joined to the shaft at the connection end;

a carbide tip on the free end of the torsion element opposite the connection end, the torsion element configured such that at a selected rotational speed, altered from a cutting speed, the carbide tip of the torsion element contacts a workpiece surface.

2. The machining tool as defined in claim 1 wherein the carbide tip comprises a plurality of carbide balls.

3. The machining tool as defined in claim 2 further comprising a flexible element intermediate the carbon balls and a body of the torsion element.

4. The machining tool as defined in claim 3 wherein the flexible element comprises a fabric flap.

5. The machining tool as defined in claim 1 further comprising a rotational element connecting the connection end of the torsional element to the shaft.

6. The machining tool as defined in claim 5 wherein the rotational element comprises a hinge.

7. The machining tool as defined in claim 5 wherein the rotational element comprises a rotary spring.

8. The machining tool as defined in claim 1 further comprising a spring providing centripetal force urging a body portion of the torsion element toward the shaft.

9. The machining tool as defined in claim 1 wherein the residual stress inducer comprises a first peening element and a second peening element and further comprising a spring interconnecting the torsion element of the first peening element through the shaft to the torsion element of the second peening element.

10. The machining tool as defined in claim 9 further comprising a slot in the shaft receiving the spring.

11. A method for inducing residual stress in a workpiece surface comprising:

machining the work piece at a cutting speed with a machine tool having a shaft having a first end configured to fit into a machining collet, a cutting portion extending from a second end of the shaft, a residual stress inducer located between the first and second ends, the residual stress inducer having:

a torsion element having a connection end and a free end, said torsion element joined to the shaft at the connection end;

a carbide tip on the free end of the torsion element opposite the connection end, the torsion element configured such that at a selected rotational speed, altered from a cutting speed, the carbide tip of the torsion element contacts a workpiece surface;

resiliently restraining the residual stress inducer within an outer diameter of the cutting portion at the cutting speed; and, altering rotational speed of the tool to a selected rotational speed thereby extending the torsion element causing contact with the workpiece surface by the carbide tip on the torsion element.

12. The method as defined in claim 11 wherein the step of altering the rotational speed comprises increasing to a second speed to increase centrifugal force on the torsion element.

13. The method as defined in claim 12 wherein the step of altering the rotational speed comprises reversing direction of the rotation and rotating at an extension speed.

14. The method as defined in claim 12 further comprising employing aerodynamic force on the torsion element to assist in expanding the torsional element into contact with the surface of the workpiece.

15. The method as defined in claim 12 further comprising reducing the rotational speed of the tool to retract the torsion elements.

* * * * *